B. HEINRICHS.
MACHINE FOR FEEDING CORRUGATED BOARD.
APPLICATION FILED MAR. 17, 1920.

1,437,843.

Patented Dec. 5, 1922.

Witness:
John Enders

Inventor:
Berg Heinrichs
by Fred Gulach
his Atty.

UNITED STATES PATENT OFFICE.

BERG HEINRICHS, OF ANDERSON, INDIANA, ASSIGNOR TO MID-WEST BOX COMPANY, OF ANDERSON, INDIANA, A CORPORATION OF INDIANA.

MACHINE FOR FEEDING CORRUGATED BOARD.

Application filed March 17, 1920. Serial No. 366,698.

*To all whom it may concern:*

Be it known that I, BERG HEINRICHS, a citizen of the United States, and a resident of Anderson, in the county of Madison and State of Indiana, have invented certain new and useful Improvements in Machines for Feeding Corrugated Board, of which the following is a full, clear, and exact description.

The invention relates to machines for feeding corrugated board.

In feeding corrugated board box blanks, it is desirable to have feed mechanism which will uniformly grip and advance the material despite inherent variation in thickness or irregularities or such as result from creasing the board on lines where it is to be folded. The object of the invention is to provide improved feed-means which are provided with treads which are sufficiently resilient and yielding to uniformly feed the material despite variations in such material.

The invention consists in the several novel features hereinafter set forth and more particularly defined by claims at the conclusion hereof.

Figure 1:
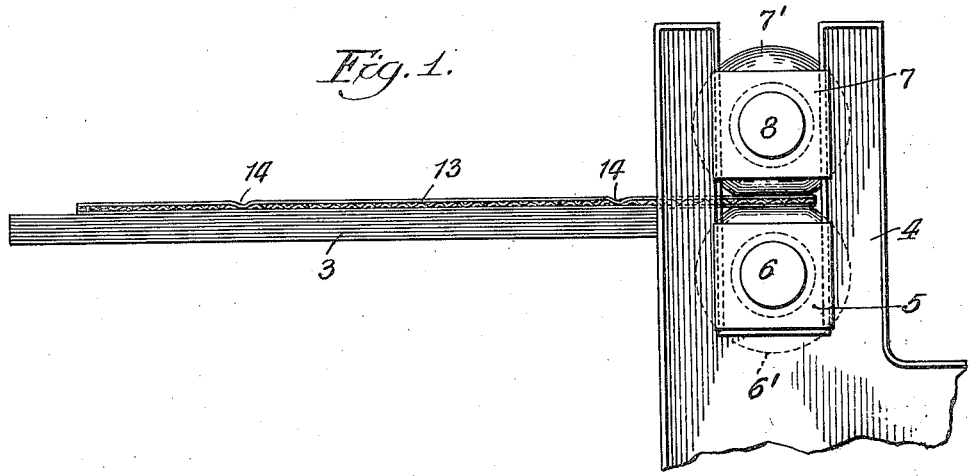
Figure 2:
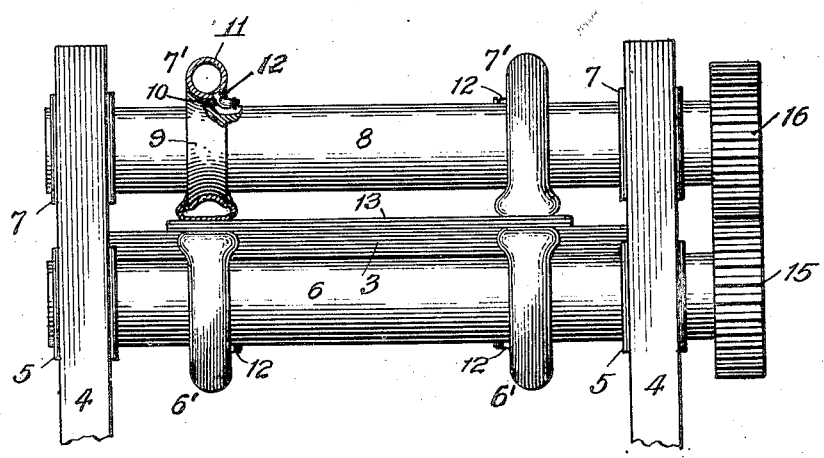

In the drawings: Fig. 1 is a side elevation of the feed mechanism embodying the invention. Fig. 2 is a front elevation, parts being shown in section.

The invention is exemplified in a machine comprising a table 3 for supporting the material, a frame 4 in which are slidably sustained suitable bearings 5 for a lower roll-shaft 6 and similar bearings 7 for the upper roll-shaft 8. These shafts are each provided with a pair of feed rolls 6' and 7' coacting with one another and of like construction. Each roll comprises a body 9 suitably fixed on its shaft and provided with a rim 10 in which is seated an annular pneumatic tube 11. This tube may be inflated through a suitable check-valve 12 similar in construction to those used for pneumatic tires. By this means, the tubes of the several rolls may be inflated to the degree desired and to adapt it for feeding material, such as corrugated board box blanks 13, which is irregular or has been creased, as at 14. The upper and lower feed shafts which carry the pneumatic feed rolls are provided with intermeshing gears 15 and 16, respectively, so that the rolls will be driven at corresponding speeds. Power will be applied to these gears, usually from the driving mechanism of the machine, which delivers the blanks into the table 3.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. Feed mechanism for corrugated board comprising a body, an inflated pneumatic tube on said body having a substantially continuous tread adapted to feed the corrugated board, a valve in the tube through which it may be inflated to the desired degree, mechanism for driving said body and means coacting with the tread of the tube to feed the board when said body is driven.

2. Feed mechanism for corrugated board comprising a plurality of rotatable bodies, a pneumatic tube on each of the bodies having a substantially continuous tread adapted to feed the corrugated board, the tubes being arranged to coact and grip the board between them, an inflating valve for each of the tubes, and mechanism for synchronously driving said bodies.

BERG HEINRICHS.